Figure 1:
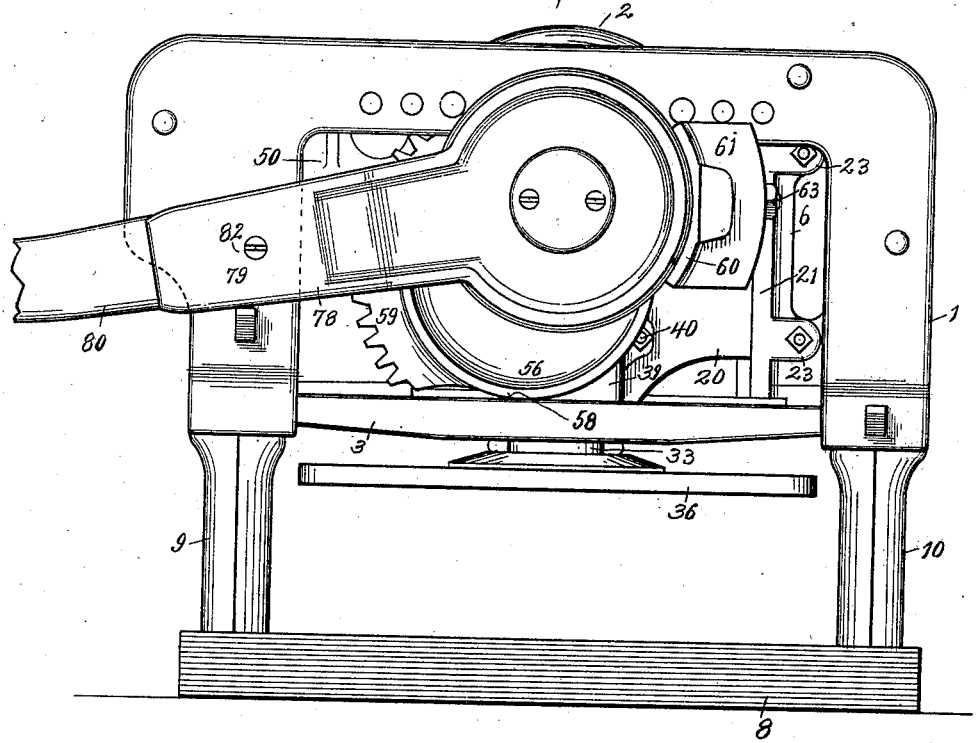

No. 670,982. Patented Apr. 2, 1901.
G. E. CLARKE.
LETTER PRESS.
(Application filed Dec. 7, 1899.)
(No Model.)  6 Sheets—Sheet 1.

Witnesses:

Inventor:
Greville E. Clarke
By Jno. S. Green
Attorneys

No. 670,982. Patented Apr. 2, 1901.
G. E. CLARKE.
LETTER PRESS.
(Application filed Dec. 7, 1899.)

(No Model.) 6 Sheets—Sheet 2.

Witnesses.

Inventor.
Greville E. Clarke
By Jno. S. Green.
Attorney.

No. 670,982. Patented Apr. 2, 1901.
G. E. CLARKE.
LETTER PRESS.
(Application filed Dec. 7, 1899.)
(No Model.) 6 Sheets—Sheet 3.
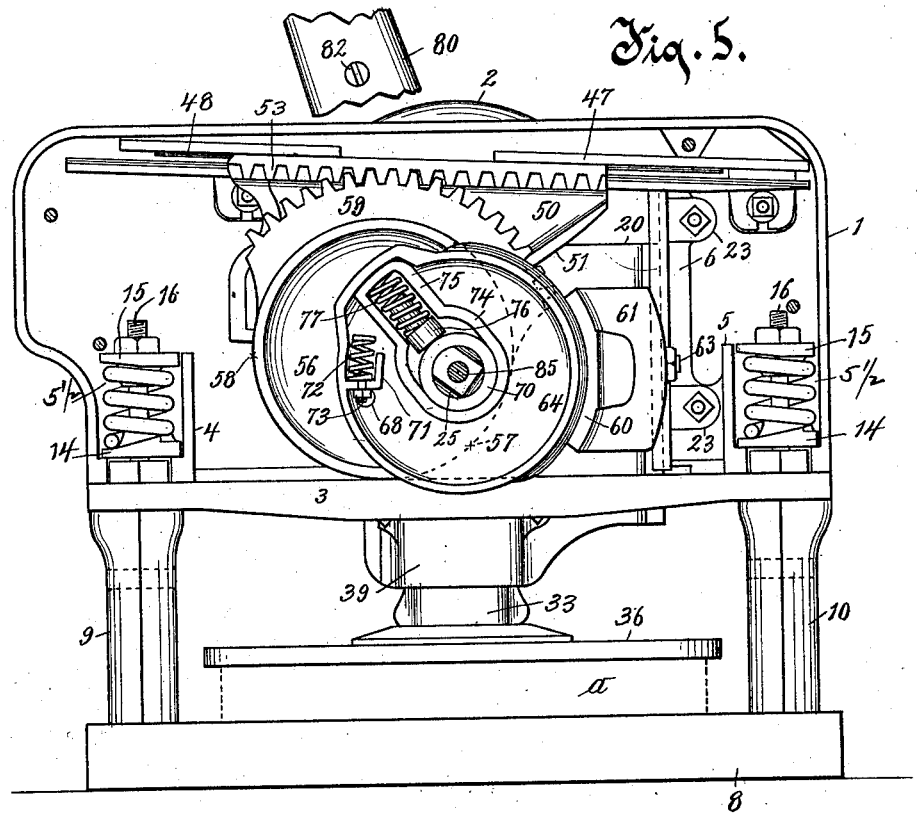
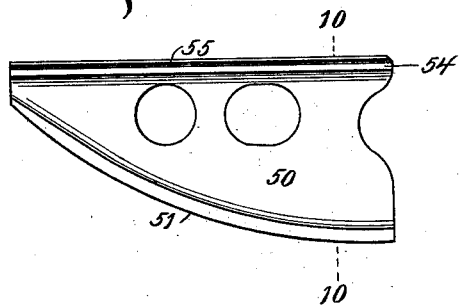
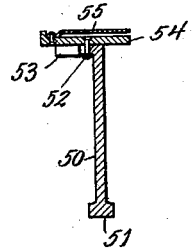
Witnesses. Inventor.

No. 670,982. Patented Apr. 2, 1901.
G. E. CLARKE.
LETTER PRESS.
(Application filed Dec. 7, 1899.)
(No Model.) 6 Sheets—Sheet 4.
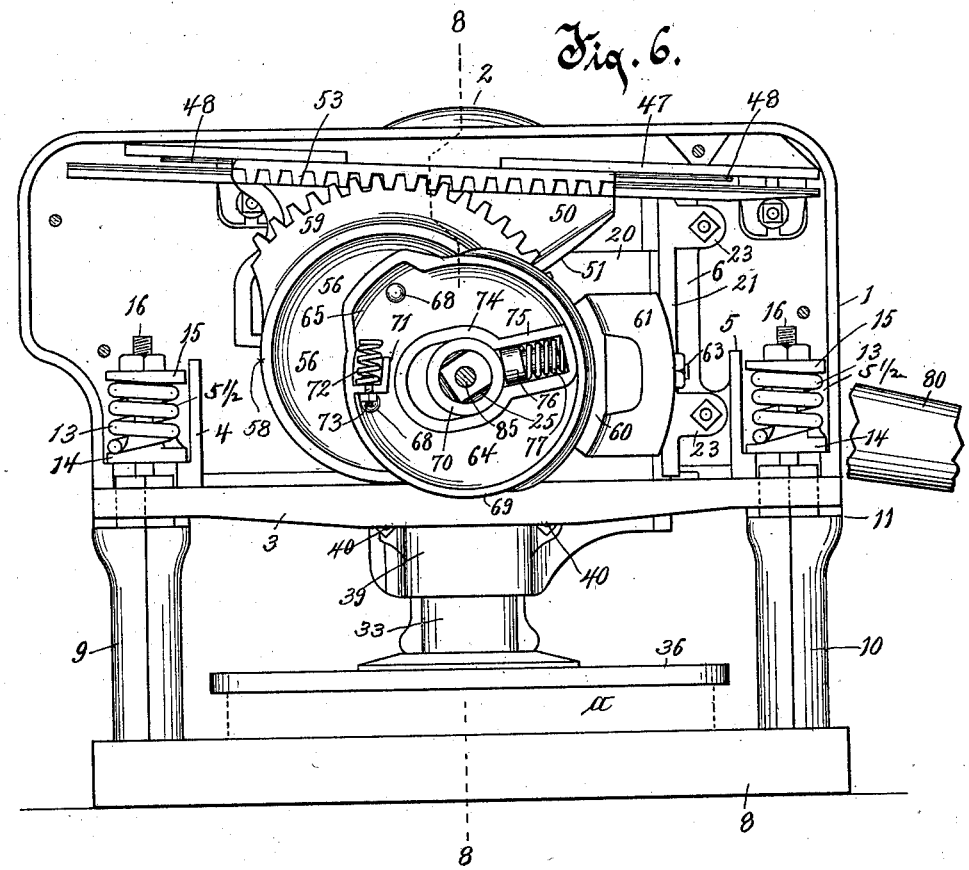
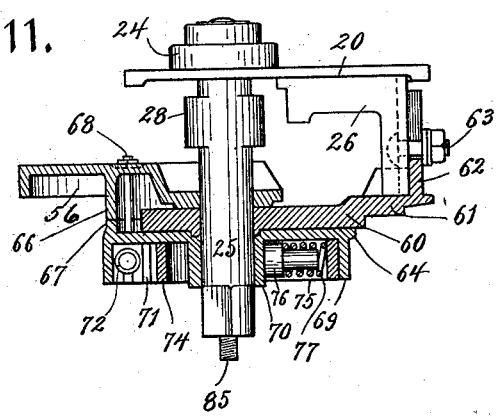
Witnesses. Inventor.
Lloyd Jones Greville E. Clarke
By
Attorneys.

No. 670,982. Patented Apr. 2, 1901.
G. E. CLARKE.
LETTER PRESS.
(Application filed Dec. 7, 1899.)
(No Model.) 6 Sheets—Sheet 5.
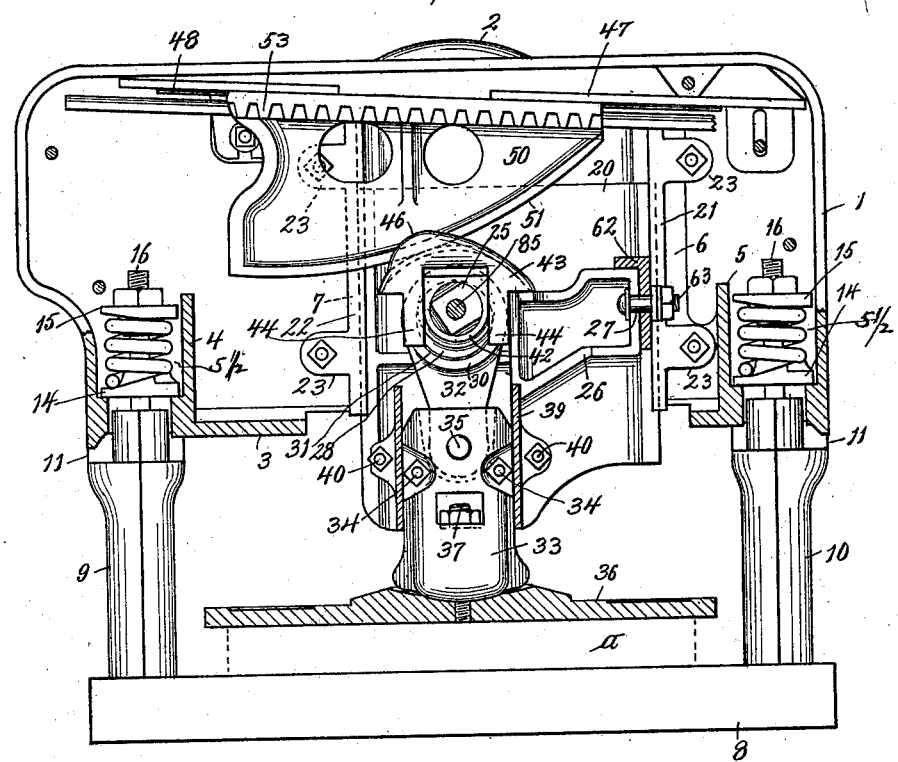

No. 670,982. Patented Apr. 2, 1901.
G. E. CLARKE.
LETTER PRESS.
(Application filed Dec. 7, 1899.)
(No Model.) 6 Sheets—Sheet 6.

Witnesses:
Lloyd James
P. V. Lipps

Inventor.
Greville E. Clarke
By Jno. S. Green.
Attorney.

UNITED STATES PATENT OFFICE.

GREVILLE E. CLARKE, OF RACINE, WISCONSIN.

LETTER-PRESS.

SPECIFICATION forming part of Letters Patent No. 670,982, dated April 2, 1901.

Application filed December 7, 1899. Serial No. 739,515. (No model.)

*To all whom it may concern:*

Be it known that I, GREVILLE E. CLARKE, a citizen of the United States of America, residing at Racine, in the county of Racine and State of Wisconsin, have invented certain new and useful Improvements in Letter-Presses, of which the following is a specification.

My invention relates to improvements in letter-presses, and particularly to improvements in letter-copying presses in which the moving elements automatically adapt themselves to a book of any thickness, the entire pressure being applied by one continuous movement of the operating-lever.

One object of my invention is to produce a letter-copying press which is self-adjusting to any thickness of book which may be inserted between the bed and the platen.

A further object of my invention is to produce a lever-operated letter-copying press in which the primary elements for raising and lowering the platen will be locked after the initial pressure has been exerted and until the initial pressure is removed.

These and other objects I attain by the arrangement of the parts and the construction of the several elements which will be hereinafter described, and illustrated in the drawings.

Figure 2:
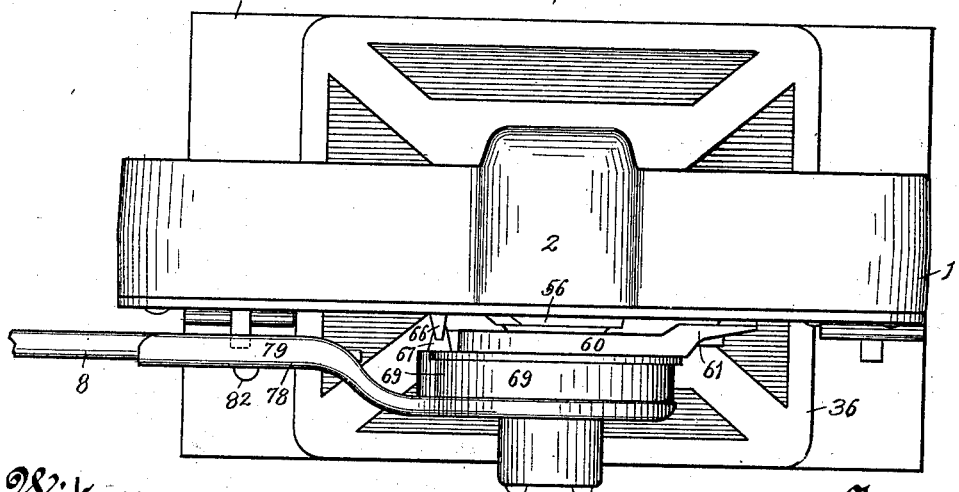
Figure 3:
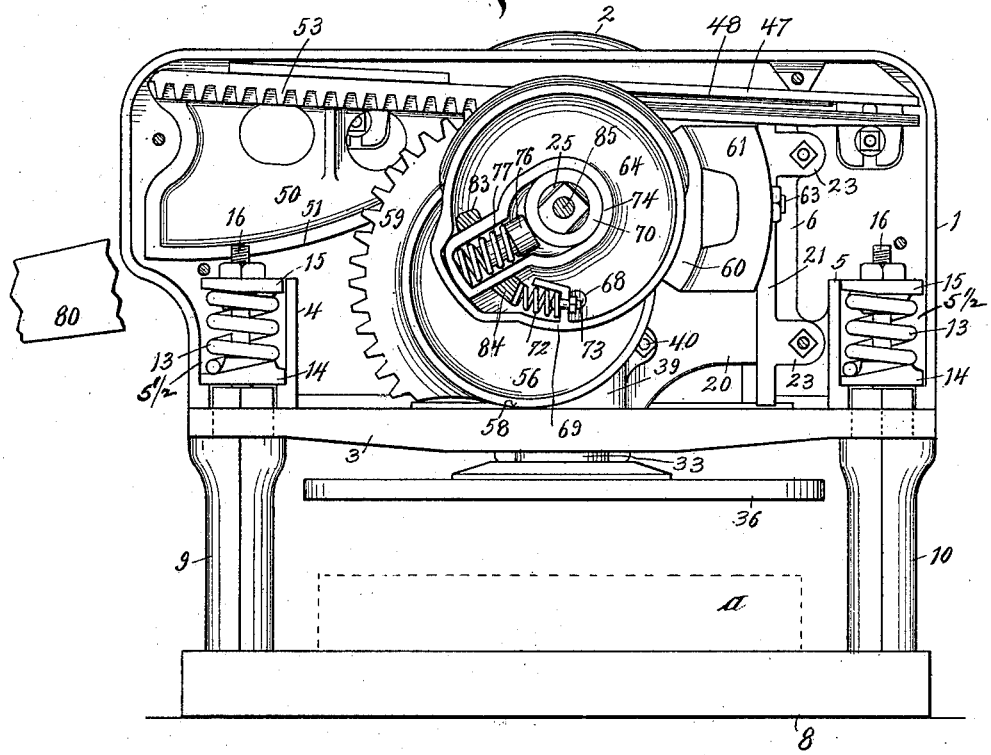
Figure 4:
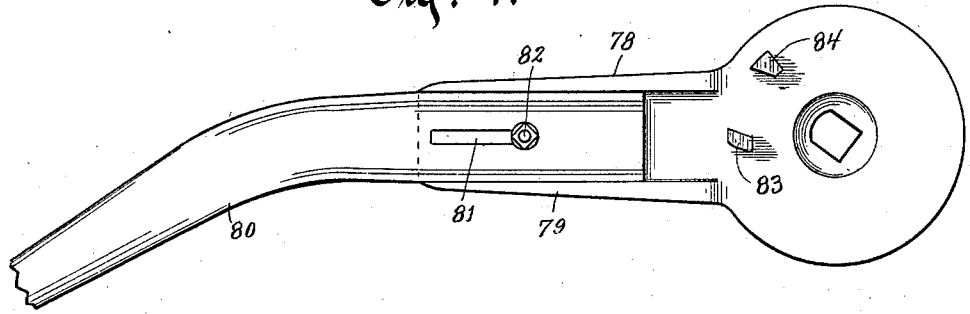
Figure 8:
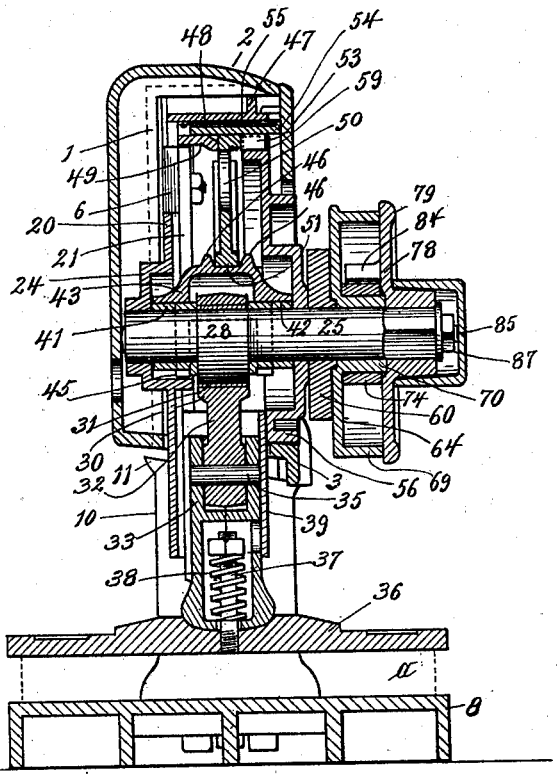
Figure 13:
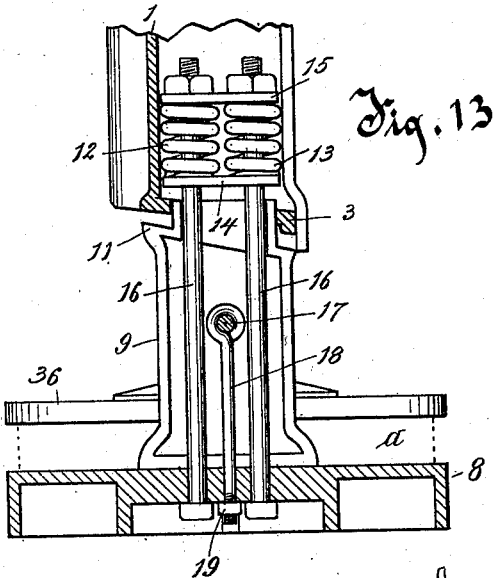

In the drawings, Figure 1 is a front elevation of my device, showing the platen raised to its highest position; Fig. 2, a plan view of the same with the platen in the same position. Fig. 3 is a front view in elevation with the front of the housing removed. In this view all of the lever except the two engaging lugs 83 and 84 is removed. Fig. 4 is a view of the lever taken from the press side. Fig. 5 is a front elevation of my device with the front of the housing removed. The platen is shown in contact with the book, and the primary elements for raising and lowering the platen are shown in the locked position. Fig. 6 is a view similar to Fig. 5, but the lever has been turned so that the secondary pressure has been exerted. In this view the parts are shown in the positions in which they will be when the maximum amount of pressure is exerted. The housing is shown raised from the standards against the stress of the equalizing-springs. Fig. 7 is a front view with some of the parts in cross-section and others entirely removed and shows the locking device for locking the primary elements which raise and lower the platen. The eccentric, with its adjacent parts for exerting the second pressure, is shown. Fig. 8 is a view in cross-section, taken on line 8 8 in Fig. 6. Fig. 9 is a detail view of the back of the member which exerts the initial pressure. Fig. 10 is a view in cross-section, taken on line 10 10 in Fig. 9. Fig. 11 is a detail view, partially in cross-section, of the main shaft and adjacent parts. Fig. 12 is a side view in cross-section of the main shaft. Fig. 13 is a side cross-sectional view of one of the standards, the equalizing-springs, and adjacent parts. Fig. 14 is a top view of the front of the housing.

Throughout the several views the same elements are denoted by like characters.

In the drawings the housing 1 for the working parts of my press is provided with an offset portion 2, which extends out to the rear and above the top of the housing. The top, back, and sides are preferably formed in one piece. A connecting member 3, formed integral with the housing, extends from one side to the other and is provided with two upright flanges 4 and 5, which form, with the sides of the housing, spring-containing compartments 5½. The rear wall of the housing is provided with two vertical rims 6 and 7.

A bed of any desired shape, so long as it has a flat top, is connected to the housing by means of standards or legs 9 and 10. These legs are each preferably formed in two parts placed together to leave a hollow interior. Each leg is formed with a shoulder 11, which extends around the same and has its upper surface beveled or higher in the back than in the front. (See Fig. 13.) The top of each leg above the bevel extends up into the spring-containing compartments 5½ on either side of the housing. Two coil-springs 12 and 13 are located in each compartment above the tops of the legs and between suitable washers or retainers 14 and 15. Extending down through each spring and the retainers is a bolt 16, provided at its lower end with a large head and a nut at its upper end. A pin 17 connects two parts of the legs together, and a belt 18, having an eye at its upper end surrounding the pin 17, extends down through the base of the leg and through the base of the press and is screw-threaded to receive a nut 19, which will be turned up against the base of the press to hold the leg in place.

A plate 20, adapted to slide vertically between the vertical ribs 6 and 7, is held in place by keepers 21 and 22, which have projecting ears 23, through which bolts pass, securing them to the back of the housing. This plate 20 has an offset portion 24 at its back formed with a circular opening, through which the main shaft 25 of the press will pass. The plate is provided at its right side with a supporting element or bracket 26, which extends out toward the front and is slotted, as shown in 27, in order that the parts may be easily assembled.

The main shaft 25 is provided with an eccentric 28. The shaft is cored out on the inside and has oil-holes 29 extending from its outer periphery to the hollow space inside. (See Fig. 12.) Surrounding the eccentric 28 is a strap 30, having a lining 31 of brass or other suitable antifriction metal. The strap is provided with a leg 32, which extends down and into a connecting member 33, which is formed in two parts secured together by means of bolts 34 and connected to the leg of the strap by a pin 35. A platen 36 is yieldingly held in contact with the connecting member 33 by means of a bolt 37 and a spring 38 surrounding the same. The connecting member 33 is held in place or guided by a guiding or covering member 39, secured to the sliding plate 20 by bolts 40 and surrounding or covering the connecting member 33.

Each side of the eccentric and surrounding the shaft 25 is a bushing 41 and 42. These bushings are flattened on top and form a support for a bearing and covering member 43, which is provided with depending lugs 44 and 45, which embrace the bushings and hold the same in place. The covering member 43, which acts as a covering member for the bushings 41 and 42 and a support for the wedge 50, which will be mentioned later, is curved on its upper outer periphery and formed with two guiding-ears 46.

Secured to the back wall of the housing and near the top of the same is a plate 47, which extends from a point near the top at the left side to a point on the right of the housing a short distance from the top. The under face of this plate is flat, and secured to the same is a thin strip of metal 48, which extends nearly the length of said plate. The plate 47 may be secured to the back of the housing in any suitable manner, and beneath said plate and running parallel with the same another plate 49 is located, secured to the housing in any suitable manner and forming a way with plate 47.

Resting on the top of the supporting member 43 is a primary pressure member or wedge 50, the lower edge 51 of which is cut on the arc of a circle. The top is formed with an offset portion 52. (See Fig. 10.) Secured by means of bolts or otherwise to the offset portion is a flat plate 54, the under side of which is cut to form a rack 53, and secured to said plate is a thin strip of metal 55. When this wedge or pressure member 50 is in position, the metal strip 55 will lie between the metal strip 48 and the plate 47.

Located on shaft 25 in front of bushing 42 is a raising-cam 56. The periphery of said cam between the points 57 and 58 is dressed off in any suitable manner, so that the cam may turn on the top of the cross-brace 3. Cam 56 is provided with a toothed flange 59, whose teeth will mesh with the rack 53 of the wedge 50. On main shaft 25 and in front of cam 56 is a supporting member 60 for the main shaft 25, which has a supporting element 61 extending over to the supporting element 26 on the sliding plate 20. (See Fig. 11.) This supporting element is provided with a backwardly-extending flange 62, which is slotted to correspond with the slot 27 of the supporting element 26. These two supporting elements 26 and 61 are secured together by means of bolt 63. Located on shaft 25 in front of the supporting member 60 is a disk 64, having an offset portion 65. This disk is rigidly connected through a flange 66 on the cam member 56 and a flange 67 on the disk 64 by means of suitable bolts 68 to the cam member 56. The disk 64 is formed with the flange 69, extending to the front and located around its entire periphery. This disk is also provided with an inner circular flange 70, which surrounds the main shaft 25. This flange 69 extends into the interior of the disk, as shown at 71, to form a seat for a coil-spring 72, which acts as a yielding buffer or stop, which is held in place in the seat by means of a bolt 73, which passes through a portion of the flange.

An actuating member 74 for the primary pressure mechanism surrounds the circular flange 70. This actuating member is formed on its inner periphery in the nature of a slot having circular ends and acts as a yielding connection between the raising mechanism and the hand-lever, (both hereinafter referred to.) One end of said slot extends out into a lug 75 of the actuating member to form a seat for a plunger 76, around the stem of which a coil-spring 77 is located. The front end of the shaft 25 is three-quarters squared to receive the actuating member or hand-lever 78, which has its end surrounding the shaft enlarged and formed circular to act as a cover to the disk 64. This lever will be, preferably, formed of the two parts 79 and 80, Fig. 4. The part 80 will be slotted, as at 81, and a bolt 82 will secure the several parts together. By means of this slot the length of the lever may be varied, so as to secure a greater or less leverage. The inner side of the circular part of the lever will be provided with two lugs 83 and 84, which will lie each side of the lug 75 of the actuating member 74. A bolt 85 will extend through the shaft 25 and will be provided with an oil-hole 86 and will be screw-threaded at its front end to receive a nut 87, which will hold the lever in place.

Operation: A book, which is represented by a, will be placed on the bed beneath the platen, as shown in Fig. 3. The lever 78 will be raised and swung to the right, as shown in Fig. 5. This operation will revolve the cam 56 around the shaft 25 and will move the pressure member or wedge 50 to the right by means of its toothed segment, which engages with the rack on the pressure member. This will allow the sliding plate 20 and the parts connected thereto, together with the shaft 25 and its eccentric and the platen, to move down until the platen is in contact with the book. As the movement of the lever is continued a pressure will be exerted on the book by means of the pressure member or wedge 50 and a slight pressure by the eccentric 28 until the actuating member 74 has passed out of the offset 65 of the disk 64. As soon as the actuating member 74 is forced out of the offset the rack and the toothed segment of the cam member 56 will be locked against further operation by means of the metallic plate 48 and the metallic plate 55, which will be pressed between the plate 47 and the plate 54, carried by the pressure member, on account of the friction. The lever being rigidly secured to the shaft carrying the eccentric always rotates the shaft as it is moved, and from the time the actuating member has passed out of offset the movement of the lever to its lowest right-hand position, as shown in Fig. 6, will cause the second or severe pressure to be given to the book. As this severe or second pressure is given to the book the housing will be lifted or forced up against the stress of the equalizing-spring and a space, as shown at 88, will appear between the top of the offset portion of the leg and the connecting-bar of the housing. When the lever reaches its lowest right-hand position, the arrangement of parts is such that the eccentric will have passed its center enough, so that the lever will not fly back. As the lever is moved back the parts which are locked will remain so until the actuating element is forced out into the offset by its spring 77, at which time the locked parts will be released and the platen will be raised from the book and will resume its normal inoperative position, as the lever reaches its lowest left-hand position.

In carrying my invention into effect the forms and constructions of the different elements in the make-up of same may be changed and varied. The elements themselves may be secured together in any suitable manner and may be formed of any suitable material.

In the description I have not gone into the detail as to the formation of the different members, as I do not wish to limit my invention to any specific construction.

Having thus described my invention, what I claim is—

1. In a letter-press the combination of a shaft, a rotatable pressure element mounted on said shaft, a lever mounted on said shaft and means yieldingly engaged with and actuated by said lever for rotating said pressure element.

2. In a letter-press, a bed, a reciprocating platen, an operating member, a rotatable pressure element and means moving with the operating member for changing the distance between the bed and the pressure element.

3. In a letter-press having a housing yieldingly secured to a bed, a platen, a rotatable shaft carrying an operating member and a rotatable pressure element, and means for moving said shaft to different positions within said housing.

4. In a letter-press, a rotatable pressure element, an operating member and means yieldingly engaged with and actuated by said operating member for shifting the center of said pressure element.

5. In a letter-press, a rotatable and a sliding pressure element actuated by the same operating member, and means for automatically locking one of said elements after the other has moved to operative position.

6. In a letter-press the combination of a pressure-eccentric, cam mechanism for raising and lowering the same and an actuating member yieldingly engaging said raising and lowering mechanism.

7. In a letter-press having a housing a rotatable pressure member, an operating member secured thereto, mechanism for raising and lowering the pressure member yieldingly engaged by the operating member and moving means for locking the pressure member against upward movement with relation to the top of the housing after the operating member has been disengaged from said raising element.

8. In a letter-press having a housing a bed and a platen, a cam element, an eccentric movable to different positions within the housing by said cam element, means for locking said eccentric in its different positions and yielding elements for equalizing the pressure exerted by said eccentric.

9. In a letter-press, a pressure-eccentric, mechanism for raising and lowering the same and a lever yieldingly engaging said raising mechanism.

10. In a letter-press, a housing, a bed, a platen, an operating member, a pressure member connected to said operating member, connections between said pressure member and the platen and a rotatable member yieldingly connected at times to the operating member.

11. In a letter-press, a pressure member, cam mechanism for shifting the center of the pressure member to different planes, a moving locking element, a rack connected thereto, teeth on the cam mechanism engaging the rack, and an actuating member yieldingly engaged with said pressure member.

12. In a letter-press, a housing yieldingly held to a bed, a rotatable pressure element, an actuating member, a platen, and means connecting said platen to said pressure element.

13. In a letter-press, a housing yieldingly held to a bed, a platen, an actuating member, a pressure-eccentric connected to said actuating member, connections between said eccentric and the platen and a raising member yieldingly connected at times to the actuating member.

14. In a letter-press, a pressure member, a rotatable member for raising and lowering said pressure member, an actuating member secured to said pressure member and yieldingly connected to the rotatable member in combination with a housing, a bed and a platen.

15. In a letter-press, a housing, a bed, a platen, a lever, an eccentric connected to said platen, and means for connecting said elements, in combination with yielding elements connecting said bed and housing.

16. In a letter-press the combination of a supporting-frame yieldingly secured to a base, a reciprocating member, a rotatable shaft, an eccentric carried by said shaft, connections between said eccentric and the reciprocating member, and means for rotating said shaft.

17. In a letter-press the combination of an eccentric, a lever and means yieldingly engaged with and actuated by said lever for shifting the center of said eccentric.

18. In a letter-press the combination of a rotatable shaft carrying an eccentric, a sliding pressure element provided with a rack, a cam mechanism provided with teeth adapted to engage said rack, an operating member or lever and means for automatically locking said sliding pressure element after the eccentric has moved to operative position.

19. In a letter-press having a housing, a rotatable eccentric carried by a shaft, a lever on said shaft, cam mechanism yieldingly engaged by the lever, and means for locking said eccentric against upward movement with relation to the top of the housing after the lever has been disengaged from said cam mechanism.

20. In a letter-press, a housing, a bed, spring connections between said housing and said bed, a rotatable shaft movable to different positions vertically within said housing, an eccentric carried by said shaft, a platen and a strap for said eccentric in connection with said platen.

21. In a letter-press, a housing, a bed, a reciprocating platen, a lever, a pressure-eccentric connected to said lever, connections between said pressure-eccentric and the platen and a cam mechanism yieldingly connected at times to said lever.

22. In a letter-press, a housing, a bed, yielding connections between said bed and said housing, an eccentric, a lever, a platen, and a strap for said eccentric in connection with said platen.

23. In a letter-press, a housing yieldingly held to a bed, a reciprocating platen a lever carried by a rotatable shaft movable to different positions vertically within said housing, an eccentric on said shaft, connections between said eccentric and the platen, and a cam mechanism yieldingly connected at times to said lever.

24. In a letter-press, a housing yieldingly held to a bed, a platen, an actuating member, a pressure-eccentric connected to said actuating member, connections between said eccentric and the platen, a raising member yieldingly connected at times to the actuating member, and means for automatically locking said raising member.

25. In a letter-press, a rotatable shaft, two pressure elements, and an actuating member yieldingly engaged with one of said pressure elements and rigidly connected to the other pressure element.

26. In a letter-press the combination of a rotatable shaft carrying a rotatable pressure element, a sliding pressure element provided with a rack, raising mechanism provided with teeth adapted to engage said rack, an operating member and means for automatically locking said sliding pressure element after the rotatable pressure element has moved to operative position.

27. In a letter-press the combination of a housing, a rotatable pressure element carried by a shaft movable to different positions vertically within said housing, a lever on said shaft, raising mechanism yieldingly engaged by the lever, and means for locking said rotatable pressure element against upward movement with relation to the top of the housing after the lever has been disengaged from said raising mechanism.

28. In a letter-press the combination of a housing, a bed, spring connections between said housing and said bed, a rotatable shaft movable to different positions vertically within said housing, a pressure element carried by said shaft, a reciprocating member and connections between said pressure element and said reciprocating member.

29. In a letter-press the combination of a housing, a bed, a reciprocating member, an actuating member, a rotatable pressure element connected to said actuating member, connections between said pressure element and the reciprocating member, and a raising and lowering mechanism yieldingly connected at times to said actuating member.

30. In a letter-press the combination of a housing, a bed, yielding connections between said bed and said housing, a rotatable pressure element, a lever mounted on a shaft carrying said pressure element, a reciprocating member, and connections between said pressure element and said reciprocating member.

31. In a letter-press the combination of a housing yieldingly held to a bed, a reciprocating member, an actuating member carried by a horizontal rotatable shaft movable to different positions vertically within said housing, a pressure element on said shaft, connections between said pressure element and the reciprocating member, and a rotatable cam mechanism yieldingly connected at times to said lever.

32. In a letter-press the combination of a housing yieldingly held to a bed, an eccentric, a lever, a platen, and means connecting said platen to said eccentric.

33. In a letter-press the combination of an eccentric, cam mechanism for raising and lowering the same and a lever yieldingly engaging said cam mechanism.

34. In a letter-press, the combination with a sliding pressure element of a shaft, a rotatable pressure element mounted on said shaft and engaging the sliding pressure element, a lever mounted on said shaft and means yieldingly engaged with and actuated by said lever for rotating said rotatable pressure element.

35. In a letter-press, the combination with a sliding pressure element of a shaft, a rotatable pressure element mounted on said shaft and engaging the sliding pressure element, a lever mounted on said shaft, an eccentric carried by said shaft, and means yieldingly engaged with and actuated by said lever for operating said sliding pressure element.

36. In a letter-press having a housing yieldingly mounted on standards rigidly secured to a bed, a platen, a rotatable shaft carrying a lever and a rotatable pressure element and means for moving said shaft to different positions within said housing.

37. In a letter-press, a longitudinally-movable pressure element, a rotatable pressure element, an operating member and means yieldingly engaged with and actuated by said operating member for shifting the center of said rotatable pressure element.

38. In a letter-press, a longitudinally-movable pressure element, a rotatable pressure element, an operating member, means yieldingly engaged with and actuated by said operating member for shifting the center of said rotatable pressure element and an automatic lock for said shifting means.

39. In a letter-press, the combination of a pressure-eccentric, cam mechanism for raising and lowering the same, an actuating member yieldingly engaging said raising and lowering mechanism and an automatic lock for said cam mechanism.

40. In a letter-press, the combination of a pressure-eccentric, cam mechanism for raising and lowering the same, an actuating member yieldingly engaging said raising and lowering mechanism and a longitudinally-movable friction-lock for said cam mechanism.

41. In a letter-press having a housing yieldingly secured to a bed, a rotatable pressure member, an operating member secured thereto, mechanism for raising and lowering the pressure member and moving means having an automatic friction-lock for holding the pressure member against upward movement while the same is being operated.

42. In a letter-press, a housing yieldingly held to a bed, a rotatable shaft movable to different positions within the housing, a sliding locking element, a pressure element carried by said shaft, a platen, and means connecting said platen to said pressure element.

43. In a letter-press, a housing, a bed, a rotatable shaft movable to different positions within the housing, a longitudinally-movable pressure element, an eccentric carried by said shaft, a platen and means connecting said platen to said eccentric.

44. In a letter-press having a housing, a bed and a platen, a cam element, an eccentric movable to different positions within the housing by said cam element, longitudinally-movable friction means for locking said eccentric in its different positions and yielding elements for equalizing the pressure exerted by said eccentric.

45. In a letter-press, a housing, a bed, a platen, an operating member, a rotatable pressure member connected to said operating member, a sliding pressure element, connections between said rotatable pressure member and the platen, and raising and lowering mechanism yieldingly connected at times to the operating member and adapted to move said sliding pressure element.

46. In a letter-press, a rotatable pressure element, a lever, means yieldingly engaging with and actuated by said lever for raising lowering and holding said rotatable pressure element in different vertical positions, and a pressure element movable to different positions longitudinally.

47. In a letter-press, a rotatable pressure element, a lever, means for raising lowering and holding said rotatable pressure element in different vertical positions, a pressure element movable to different positions horizontally and automatic mechanism for locking the same.

48. In a letter-press, a housing yieldingly held to a bed, a rotatable pressure element, an actuating member, a platen, means connecting said platen to said rotatable pressure element and a pressure element movable horizontally to different positions.

49. In a letter-press, a sliding pressure element, an actuating member, a pressure-eccentric connected to said actuating member and shifting means connected at times to said actuating member.

50. In a letter-press, two pressure members, means for raising and lowering one of said pressure members and moving the other pressure member horizontally, an actuating member connected to one of said pressure members and yieldingly connected to said raising and lowering means.

51. In a letter-press, a rotatable pressure element, a lever, means yieldingly engaged with and actuated by said lever for rotating said pressure element, and a sliding friction-lock for said means.

52. In a letter-press, an eccentric actuated by a lever and movable to different vertical positions, horizontally-movable means located above said eccentric for holding the same down in its different positions, and a friction-lock for said means.

53. In a letter-press having a pressure mechanism and an actuating member therefor, a bed, standards secured to said bed, and a housing resting on said standards and yieldingly held against upward movement.

54. In a letter-press having pressure mechanism, an actuating member therefor and a platen in connection with said pressure mechanism, a bed, standards rigidly secured to said bed, a housing resting on said standards and yieldingly held against upward movement by means of springs located within said housing.

55. In a letter-press, a sliding pressure element movable with an actuating member until a certain pressure has been accomplished, means for automatically locking said sliding pressure element after said pressure has been accomplished and a rotatable pressure member movable at all times with said actuating member.

56. In a letter-press, a rotatable pressure element movable up and down within a support, a wedge-shaped sliding pressure element adapted by means yieldingly engaging with an actuating member rigidly connected to the rotatable pressure element to force said rotatable pressure element downward.

Signed by me at Racine, Racine county, Wisconsin, this 27th day of November, 1899.

GREVILLE E. CLARKE.

Witnesses:
ERASTUS C. PECK,
H. W. BERWICK.